(12) United States Patent
Zacks et al.

(10) Patent No.: US 12,199,968 B2
(45) Date of Patent: *Jan. 14, 2025

(54) ENHANCED MULTI-FACTOR AUTHENTICATION BASED ON PHYSICAL AND LOGICAL PROXIMITY TO TRUSTED DEVICES AND USERS

(71) Applicant: Cisco Technology, Inc., San Jose, CA (US)

(72) Inventors: David J Zacks, Vancouver (CA); Carlos M. Pignataro, Cary, NC (US); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,028

(22) Filed: Sep. 22, 2023

(65) Prior Publication Data

US 2024/0031349 A1    Jan. 25, 2024

Related U.S. Application Data

(63) Continuation of application No. 17/178,234, filed on Feb. 17, 2021, now Pat. No. 11,805,112.

(Continued)

(51) Int. Cl.
*H04L 9/40* (2022.01)
*G06F 21/31* (2013.01)

(52) U.S. Cl.
CPC .............. *H04L 63/08* (2013.01); *G06F 21/31* (2013.01); *H04L 63/102* (2013.01);
(Continued)

(58) Field of Classification Search
CPC ..... H04L 63/08; H04L 63/102; H04L 63/107; H04L 63/0861; H04L 2463/082;
(Continued)

(56) References Cited

U.S. PATENT DOCUMENTS 5,771,291 A    6/1998  Newton et al.
8,266,378 B1 *  9/2012  Jevans ................ G06F 12/1466
                                           711/115

(Continued)

OTHER PUBLICATIONS

Office Action for U.S. Appl. No. 17/178,234, mailed on Apr. 4, 2023, Zacks, "Enhanced Multi-Factor Authentication Based On Physical and Logical Proximity To Trusted Devices and Users", 8 pages.

(Continued)

*Primary Examiner* — Aravind K Moorthy
(74) *Attorney, Agent, or Firm* — Lee & Hayes, P.C.

(57) ABSTRACT

This disclosure describes techniques for performing enhanced authentication of a device based on physical proximity of the device to one or more other authenticated devices. An example method includes performing a first authentication of a first device or a first user and connecting the first device to a protected resource. Based on determining that the first device is within a threshold distance of a second, authenticated, device, a reauthentication interval is selected. Based on determining that the reauthentication interval has expired, a second authentication is initiated by transmitting, to the first device or a third device associated with the first user, a request for an authentication factor.

20 Claims, 6 Drawing Sheets

Related U.S. Application Data

(60) Provisional application No. 63/147,181, filed on Feb. 8, 2021.

(52) U.S. Cl.
CPC .... *H04L 63/107* (2013.01); *G06F 2221/2139* (2013.01); *H04L 63/0861* (2013.01); *H04L 2463/082* (2013.01)

(58) Field of Classification Search
CPC ............. G06F 21/31; G06F 2221/2139; G06F 2221/2111; H04W 12/065; H04W 12/082; H04W 12/63
See application file for complete search history.

(56) References Cited

U.S. PATENT DOCUMENTS

| | | | |
|---|---|---|---|
| 8,356,171 B2* | 1/2013 | Shatzkamer | H04L 63/08 713/193 |
| 8,539,567 B1* | 9/2013 | Logue | H04L 63/08 709/227 |
| 8,584,219 B1 | 11/2013 | Toole et al. | |
| 8,635,373 B1* | 1/2014 | Supramaniam | H04L 63/08 709/248 |
| 8,793,774 B1 | 7/2014 | Kumar et al. | |
| 8,893,284 B2* | 11/2014 | Sadler | G06F 21/32 713/172 |
| 8,918,079 B2* | 12/2014 | Bentley | H04L 63/107 455/411 |
| 8,929,257 B1 | 1/2015 | Goepp et al. | |
| 8,935,768 B1 | 1/2015 | Tyree | |
| 9,053,063 B2* | 6/2015 | Walter | H04L 65/1069 |
| 9,177,123 B1 | 11/2015 | Farquhar | |
| 9,268,920 B1 | 2/2016 | Butler et al. | |
| 9,270,649 B1 | 2/2016 | Ng | |
| 9,282,130 B1 | 3/2016 | Goepp et al. | |
| 9,294,502 B1 | 3/2016 | Benishti | |
| 9,398,007 B1 | 7/2016 | Wegener et al. | |
| 9,596,244 B1* | 3/2017 | Kozolchyk | H04L 63/06 |
| 9,641,526 B1 | 5/2017 | Gopalakrishnan et al. | |
| 9,800,570 B1* | 10/2017 | Bleisch | H04W 12/082 |
| 9,898,626 B1* | 2/2018 | Goldberg | G06F 21/88 |
| 10,009,316 B1 | 6/2018 | Shavell et al. | |
| 10,212,591 B1 | 2/2019 | Queru | |
| 10,320,569 B1 | 6/2019 | Wentz et al. | |
| 10,321,316 B1 | 6/2019 | Belton, Jr. et al. | |
| 10,492,071 B1 | 11/2019 | Adiga et al. | |
| 11,012,400 B1 | 5/2021 | Xu et al. | |
| 11,805,112 B2* | 10/2023 | Zacks | H04W 12/065 |
| 11,863,549 B2* | 1/2024 | Zacks | H04L 63/107 |
| 2003/0152235 A1 | 8/2003 | Cohen et al. | |
| 2004/0034771 A1 | 2/2004 | Edgett et al. | |
| 2004/0156336 A1* | 8/2004 | McFarland | H04W 16/14 370/341 |
| 2004/0215980 A1 | 10/2004 | Hamid | |
| 2005/0117752 A1* | 6/2005 | Iima | H04L 63/08 380/270 |
| 2006/0089125 A1 | 4/2006 | Frank | |
| 2007/0014413 A1* | 1/2007 | Oliveira | H04L 63/06 380/278 |
| 2007/0016743 A1* | 1/2007 | Jevans | G06F 21/32 711/164 |
| 2007/0039039 A1* | 2/2007 | Gilbert | H04L 63/0853 726/4 |
| 2007/0050632 A1 | 3/2007 | Matsuoka et al. | |
| 2007/0083771 A1 | 4/2007 | Chen | |
| 2008/0092214 A1 | 4/2008 | Zavalkovsky et al. | |
| 2009/0131015 A1 | 5/2009 | Bentley et al. | |
| 2010/0011427 A1 | 1/2010 | Zayas | |
| 2010/0167692 A1 | 7/2010 | Haynes et al. | |
| 2011/0222465 A1 | 9/2011 | Arashin et al. | |
| 2012/0233674 A1 | 9/2012 | Gladstone et al. | |
| 2013/0167211 A1 | 6/2013 | Kamat | |
| 2013/0179966 A1 | 7/2013 | Sawamura | |
| 2013/0191903 A1 | 7/2013 | Jaudon et al. | |
| 2014/0093072 A1 | 4/2014 | Biradar et al. | |
| 2014/0282868 A1 | 9/2014 | Sheller et al. | |
| 2014/0376029 A1 | 12/2014 | Itoh | |
| 2015/0033305 A1* | 1/2015 | Shear | G06F 21/53 726/11 |
| 2015/0128240 A1 | 5/2015 | Richards et al. | |
| 2015/0195334 A1 | 7/2015 | Chew | |
| 2015/0195394 A1 | 7/2015 | Bietz et al. | |
| 2015/0229650 A1 | 8/2015 | Grigg et al. | |
| 2016/0132670 A1 | 5/2016 | Salama et al. | |
| 2016/0165036 A1 | 6/2016 | Leow | |
| 2016/0242033 A1 | 8/2016 | Jung et al. | |
| 2016/0344747 A1 | 11/2016 | Link, II | |
| 2016/0359838 A1 | 12/2016 | Dasgupta et al. | |
| 2016/0364610 A1 | 12/2016 | Jung et al. | |
| 2017/0063052 A1 | 3/2017 | Azar et al. | |
| 2017/0094517 A1 | 3/2017 | Jakobsson | |
| 2017/0126660 A1 | 5/2017 | Brannon | |
| 2017/0140139 A1 | 5/2017 | Heath et al. | |
| 2017/0142589 A1 | 5/2017 | Park et al. | |
| 2017/0149784 A1* | 5/2017 | White, Jr | H04L 63/102 |
| 2017/0344745 A1 | 11/2017 | Wadley et al. | |
| 2018/0033089 A1 | 2/2018 | Goldman et al. | |
| 2018/0076964 A1 | 3/2018 | O'Connor et al. | |
| 2018/0091493 A1 | 3/2018 | Raounak | |
| 2018/0101678 A1 | 4/2018 | Rosa | |
| 2018/0121683 A1* | 5/2018 | Goldberg | H04L 63/0853 |
| 2018/0131686 A1 | 5/2018 | Brannon | |
| 2018/0248863 A1 | 8/2018 | Kao et al. | |
| 2018/0248892 A1 | 8/2018 | Hefetz | |
| 2018/0341758 A1 | 11/2018 | Park et al. | |
| 2018/0351944 A1 | 12/2018 | Cho et al. | |
| 2018/0359221 A1 | 12/2018 | Dorfman | |
| 2019/0026501 A1 | 1/2019 | Martel et al. | |
| 2019/0044942 A1 | 2/2019 | Gordon et al. | |
| 2019/0116179 A1 | 4/2019 | Xu | |
| 2019/0121961 A1 | 4/2019 | Coleman et al. | |
| 2019/0121962 A1 | 4/2019 | Coleman et al. | |
| 2019/0364034 A1 | 11/2019 | Alexander | |
| 2020/0013051 A1 | 1/2020 | Kadiwala et al. | |
| 2020/0026830 A1 | 1/2020 | Alameh et al. | |
| 2020/0045055 A1 | 2/2020 | DiAcetis et al. | |
| 2020/0053083 A1 | 2/2020 | Kunz et al. | |
| 2020/0137056 A1 | 4/2020 | Adiga et al. | |
| 2020/0169562 A1* | 5/2020 | Moldoveanu | G06F 9/542 |
| 2020/0177602 A1 | 6/2020 | Koyun et al. | |
| 2020/0280616 A1 | 9/2020 | Sim et al. | |
| 2020/0294339 A1 | 9/2020 | Rao et al. | |
| 2021/0058339 A1 | 2/2021 | Zhang et al. | |
| 2021/0227383 A1 | 7/2021 | Alameh et al. | |
| 2022/0021706 A1 | 1/2022 | Jubilee et al. | |
| 2022/0046011 A1 | 2/2022 | Bronstein | |
| 2022/0046415 A1 | 2/2022 | Chiang et al. | |
| 2022/0255913 A1 | 8/2022 | Zacks et al. | |
| 2022/0255922 A1 | 8/2022 | Zacks et al. | |

OTHER PUBLICATIONS

Office Action for U.S. Appl. No. 17/178,234, mailed on Oct. 14, 2022, Zacks, "Enhanced Multi-Factor Authentication Based On Physical and Logical Proximity To Trusted Devices and Users", 26 pages.

Office Action for U.S. Appl. No. 17/178,199, mailed on Oct. 31, 2022, Zacks, "Adjusting Security Policies Based On Endpoint Locations", 61 pages.

\* cited by examiner

ENHANCED MULTI-FACTOR AUTHENTICATION BASED ON PHYSICAL AND LOGICAL PROXIMITY TO TRUSTED DEVICES AND USERS

CROSS-REFERENCE TO RELATED APPLICATIONS

The present application is a continuation of U.S. application Ser. No. 17/178,234, filed on Feb. 17, 2021, which claims the priority of U.S. Provisional Application No. 63/147,181, filed on Feb. 8, 2021, each of which is hereby incorporated by reference herein in its entirety.

TECHNICAL FIELD

The present disclosure relates generally to enhanced multi-factor authentication of a first device associated with a first user based on a communication session between the first device and a second device operated by a previously authenticated second user. The present disclosure also relates to enhanced multi-factor authentication of a first device associated with a first user based on the physical proximity of the first device to a second device operated by a previously authenticated second user.

BACKGROUND

Authentication is the process of verifying the identity of a user or device. In general, computer security systems perform authentication as a prerequisite for enabling a device to connect to a secured resource, such as a remote resource. By authenticating the user or device, the security systems can prevent an unauthorized user or device from accessing the secured resource.

Multi-factor authentication (MFA) is the process of verifying the identity of the user or device based on confirmation of at least two factors from the user or device. For example, a password entered into the device may be a first factor and a picture of a particular user associated with the device may be a second factor. Computer security systems may prevent the user or device from accessing the secured resource until the systems receive the multiple factors from the user or device. In general, an MFA scheme is more stringent than a single-factor authentication scheme and can therefore enhance the security of the protected resource.

In various examples, a security system may force the user or device to reauthenticate after expiration of a particular time period. However, users may find repeated reauthentication, particularly complex MFA processes, frustrating and inconvenient. In addition, some authentication factors associated with an MFA process are more difficult or invasive for a user to input than others. Accordingly, it may be advantageous to implement an MFA process that is repeated relatively infrequently for devices and users that are more likely to be authorized.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
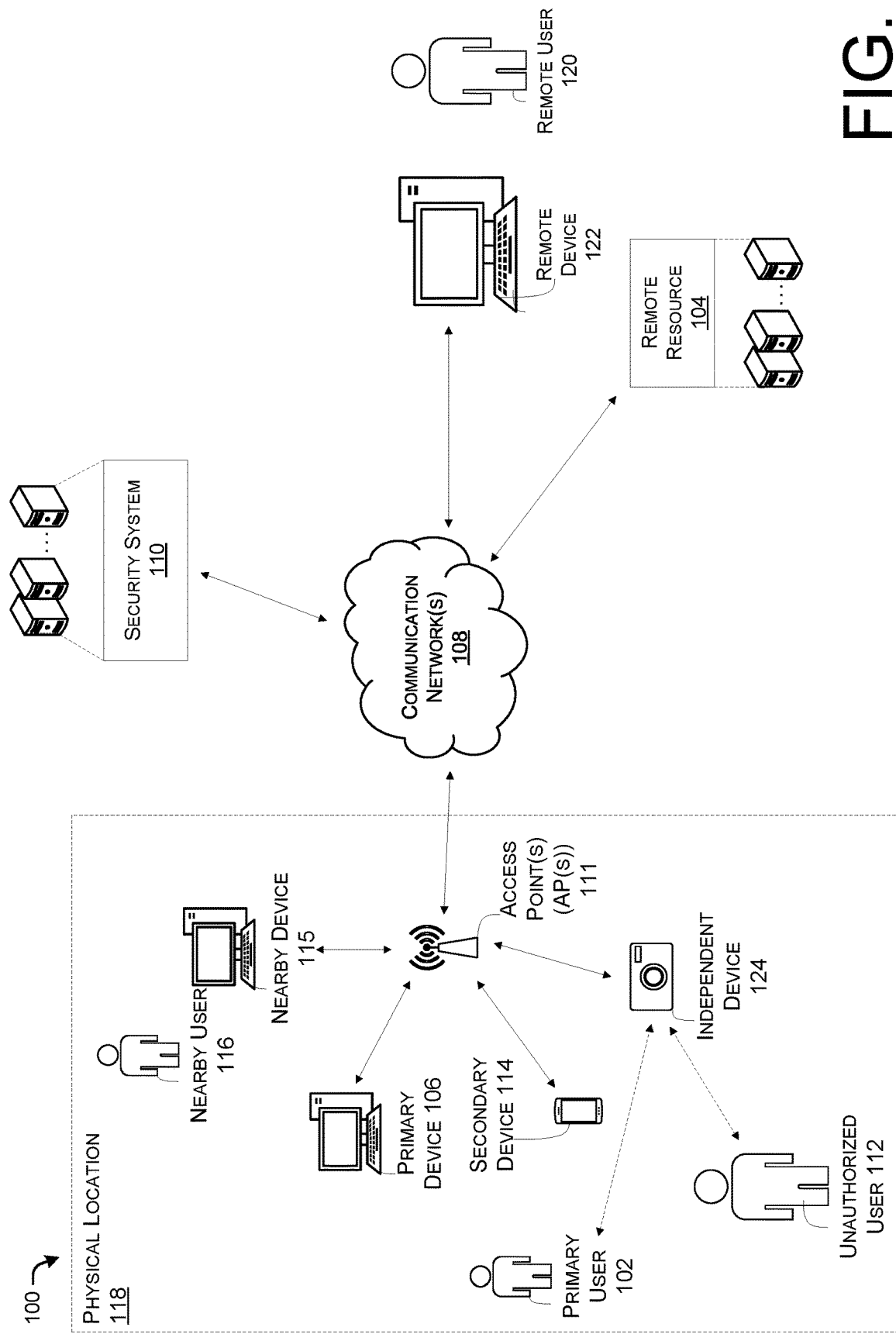
FIG. 1 illustrates an example environment for enhanced authentication based on proximity and/or presence.

An example method includes performing, at a first time, a first authentication of a first device or a first user of the first device; determining that the first device is connected to at least one second device in a communication session; determining a reauthentication interval based on the first device being connected to the at least one second device in the communication session; and initiating, at a second time that is after the first time by the reauthentication interval, a second authentication of the first device or the first user of the first device. The at least one second device or at least one second user of the at least one second device are authenticated.

In some instances, performing the first authentication includes: transmitting, to the first device, a request for a first authentication factor; receiving, from the first device, the first authentication factor; transmitting, to the first device or a third device, a request for a second authentication factor; and receiving, from the first device or the third device, the second authentication factor. In some examples, the communication session includes a voice call, a video call, or an instant messaging session, wherein the first device transmits first data to the second device in the communication session, and wherein the second device transmits second data to the first device in the communication session. In some cases, the reauthentication interval is longer than a default interval. According to some implementations, initiating the second authentication includes: disconnecting the first device from a secured resource. In some examples, initiating the second authentication includes: transmitting, to the first device or a third device associated with the first user, a request for a third authentication factor.

Some examples include selecting the third authentication factor based on the first device being connected to the at least one second device in the communication session. According to some implementations, the example method includes receiving, from at least one independent device, an indication that the first user is operating the first device, wherein determining the reauthentication interval is further based on the indication that the first user is Operating the First Device.

Example Embodiments

This disclosure describes various implementations for adjusting a trust level associated with a user based on a physical and/or logical proximity of the user, or a device of the user, to previously authenticated users or devices. The trust level can be used to select or adjust a security policy associated with the user, such an authentication policy associated with the user.

Implementations described within the present disclosure provide specific improvements to the technical fields of computer security and authentication. By considering the physical and/or logical proximity of a device to other, currently authenticated devices, as well as other data confirming the presence of an authorized user with the device, various systems described herein can effectively assess the trustworthiness of the device. Accordingly, the systems may be able to implement targeted security policies for that device, such as authentication schemes, that can provide a sufficient level of security to a protected resource while also providing an enhanced user experience for a user of the device.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for enhanced authentication based on proximity and/or presence. As shown, a primary user 102 may be accessing a remote resource 104 using a primary device 106. As used herein, the term "primary device," and its equivalents, may refer to an endpoint device that is receiving data from a resource, transmitting data to the resource, requesting to receive data from the resource, requesting to transmit data to the resource, or a combination thereof. Examples of primary devices include mobile phones, tablet computers, personal computers, laptops, smart televisions, servers, certain Internet of Things (IoT) devices, and the like. As used herein, the terms "resource," "computing resource," and their equivalents, may refer to a hardware resource (e.g., a processor, memory, or the like), a software resource (e.g., a virtual machine (VM)), or a combination thereof. In various examples, the remote resource 104 may store or otherwise be configured to provide sensitive data.

As used herein, the term "sensitive data," and its equivalents, may refer to any confidential data whose access is at least partially restricted. For example, an enterprise may implement a security mechanism (e.g., a firewall) that prevents unauthorized users and/or devices from accessing the sensitive data. In some examples, an enterprise may implement a security mechanism that prevents unauthorized users and/or devices from transmitting data to the remote resource 104, thereby preventing nefarious actors from exposing and/or modifying the sensitive data stored by the remote resource 104.

The remote resource 104 may be implemented on one or more devices that are configured to communicate with the primary device 106 over one or more communication networks 108. As used herein, the term "communication network," and its equivalents, can refer to any network configured to transfer data from one endpoint to another. A communication network may include one or more fiber-optic networks, one or more wired networks, one or more wireless networks, or any combination thereof. Examples of communication networks include, for instance, BLUETOOTH networks, WI-FI networks, 3GPP radio access networks (RANs) (e.g., including an gNodeB, an eNodeB, etc.), core networks (e.g., a $3^{rd}$ Generation Partnership Project (3GPP) core network, such as a $3^{rd}$ Generation (3G) core network, an Evolved Packet Core (EPC), or a 5G Core (5GC), etc.), an IP multimedia subsystem (IMS) network, the Internet, or the like. Various elements illustrated in FIG. 1 transmit data to one another via the communication network(s) 108.

As shown in FIG. 1, the primary device 106 may be connected to one or more access points (APs) 111 that are, in turn, connected to the communication network(s) 108. An AP may refer to a device configured to transmit and/or receive wireless communications from devices within a particular coverage area. Examples of APs include, e.g., WI-FI access points, gNodeBs, eNodeBs, RANs, and the like. Although not illustrated in FIG. 1, in some examples, the AP(s) 111 are part of the communication network(s) 108.

A security system 110 may be configured to protect the remote resource 104. In various implementations, the security system 110 may be configured to authenticate devices and/or users prior to the devices connecting to the remote resource 104. In particular, the security system 110 may be configured to authenticate the primary device 106 and/or the primary user 102. Once the primary device 106 and/or the primary user 102 has been authenticated by the security system 110, the security system 110 may be further configured to enable the primary device 106 to connect to the remote resource 104. When the primary device 106 is connected to the remote resource 104, the primary device 106 may receive data from the remote resource 104 and/or may transmit data to the remote resource 104.

In various implementations, the security system 110 may be configured to reauthenticate the primary device 106. For example, the security system 110 may authenticate and connect the primary device 106 to the remote resource 104 at a first time, disconnect the primary device 106 from the remote resource 104 at a second time, and reconnect the primary device 106 to the remote resource 104, conditionally, if the primary device 106 and/or the primary user 102 is reauthenticated. By reauthenticating the primary device 106 and/or the primary user 102, the security system 110 may prevent the chance that an unauthorized user 112 has gained control of the previously authenticated primary device 106 and has accessed the remote resource 104. For instance, the security system 110 may prevent the unauthorized user 112 from using the primary device 106 to transmit malicious data to the remote resource 104 and/or to receive sensitive data from the remote resource 104. As used herein, the term "unauthorized user," and its equivalents, may refer to an individual using a device and/or seeking to access a protected resource without permission from an administrator or other entity protecting the resource. In contrast, the term "authorized user," and its equivalents, may refer to an individual using a device and/or seeking to access a protected resource with permission from an administrator or other entity protecting the resource.

A time period between the security system 110 performing consecutive authentications of the primary device 106 may be referred to as a "reauthentication interval." For example, the reauthentication interval can begin when the primary device 106 is authenticated and/or connected to the remote resource 104 and can end when the primary device 106 is disconnected from the remote resource 104. In various implementations, the security system 110 may adjust the length reauthentication interval. By shortening the length of the reauthentication interval for the primary device 106 and/or the primary user 102, the security system 110 can decrease the chance that the unauthorized user 112 has taken control of the primary device 106 and is using the primary device 106 to access the remote resource 104. However, when the reauthentication interval is relatively short and reauthentication is performed multiple times, but the primary device 106 is used continuously by the primary user 102, the frequent reauthentications forced by the security system 110 may be disruptive to the primary user 102. Thus, to improve the experience of the primary user 102, the security system 110 may keep the reauthentication interval relatively long unless there is an independent reason to mistrust that the primary device 106 is operated by the primary user 102.

In some examples, the security system 110 may authenticate the primary device 106 and/or the primary user 102 using multi-factor authentication (MFA). As used herein, the terms "multi-factor authentication," "MFA," and their equivalents, can refer to a process of confirming that a device, the identity of a user of the device, or both, are authorized by requesting and receiving at least two authentication factors from the device, the user, and/or one or more additional devices associated with the user. A user or device is "authorized" when they have permission to access a secure resource. When compared to single-factor authentication, MFA is more likely to successfully authenticate an authorized user or device and to successfully deny an unauthorized user or device. An example MFA process includes requesting a first authentication factor; based on receiving the first authentication factor, requesting a second authentication factor; and based on receiving the second authentication factor, enabling access to a protected resource (e.g., the remote resource 104). The first authentication factor and/or the second authentication factor can be received from a single device or multiple devices associated with the same user.

In various examples, the security system 110 may request authentication factors from the primary device 106 and/or the primary user 102. In some cases, the security system 110 receives at least one of the authentication factors from the primary device 106. According to some implementations, the security system 110 receives at least one of the authentications from a secondary device 114. As used herein, the term "secondary device," and its equivalents, may refer to a device that is registered or otherwise associated with a user seeking to access a protected resource via a primary device, wherein the secondary device is not the primary device. For example, the security system 110 may store data indicating that the secondary device 114 is registered to the primary user 102. Examples of secondary devices include mobile phones, tablet computers, personal computers, laptops, smart televisions, servers, certain IoT devices, and the like.

The security system 110 may request any of a variety of different authentication factors in order to authenticate the primary device 106 and/or the primary user 102. Authentication factors, in some cases, include codes that are known to an authorized user. As used herein, the term "code," and its equivalents, can refer to a predetermined combination of alphanumeric characters and/or pixels. A password is an example of a code that can be used as an authentication factor. Other examples of codes include usernames, personal identification numbers (PINs), employee numbers, social security numbers (SSNs), driver's license numbers, Quick Response (QR) codes, and the like.

Examples of authentication factors include evidence of possession of an object associated with an authorized user. In some examples, the object may be another device associated with the authorized user. An authentication factor may be evidence that the user attempting to use a primary device is also in possession and control of a secondary device associated with the primary device. For instance, the security system 110 may transmit a push notification to the secondary device 114 and the primary user 102 may confirm that the primary device 106 is authorized by confirming receipt of the push notification (e.g., by entering a code specified in the push notification into the primary device 106 or selecting a button associated with the push notification on the secondary device 114). In some implementations, authentication factors may include evidence of possession of a card, a physical key, a Universal Serial Bus (USB) drive, or the like. For example, the primary device 106 may include a scanner that is configured to scan a code or chip integrated into the card, key, or USB stick.

Certain authentication factors include evidence that a device is in a particular location associated with an authorized user. For example, an authentication factor may be evidence that the primary device 106 is located in a building associated with a home or workplace of the primary user 102. In some cases, the primary device 106 self-reports its location to the security system 110. For example, the primary device 106 may receive signals from multiple satellites (e.g., Global Positioning System (GPS) satellites) and determine the location of the primary device 106 based on the signals. In some examples, the security system 110 receives a signal indicative of the location of the primary device 106. For example, the signal may indicate that the primary device 106 is connected to an AP (e.g., one of the AP(s) 111) associated with a particular coverage area, which may indicate that the primary device 106 is located in the coverage area.

Some authentication factors include evidence of the presence of an authorized user. In some implementations, authentication factors may be biometric factors. As used herein, the term "biometric factor," and its equivalents, can refer to evidence of the presence of a body associated with an authorized user (e.g., the primary user 102). For example, a biometric factor may refer to data indicative of the authorized user speaking (e.g., an audible password), data indicative of a fingerprint of the authorized user (e.g., a fingerprint scan), data indicative of an eye of the authorized user (e.g., an iris or retina scan), data indicative of a face of the user (e.g., a facial scan), and so on. The security system 110 may recognize a biometric factor by performing techniques such as voice recognition, fingerprint recognition, facial recognition, and the like.

Various authentication factors may be associated with different stringency levels. That is, because some authentication factors may be easier to steal or reproduce by unauthorized users and/or devices than others, the type of authentication factors requested may impact the certainty that a given user and/or device supplying the authentication factors is, in fact, the authorized user and/or device. Some examples of authentication factors with relatively low stringency levels (e.g., "nonstringent authentication factors") include, for example, codes that can be stolen and input by unauthorized users. In some cases, evidence of the possession of an object and/or evidence that the device is in a particular location may be associated with a higher stringency than the codes, because stealing an object and/or being in a location associated with the authorized user may be more difficult than stealing a code. Biometric factors may have relatively high stringency factors that are greater than the stringency factors of codes, evidence of possession of an object, or evidence that the device is in a particular location. This is because biometric factors are relatively difficult to fake or steal.

Although requiring biometric factors and other types of authentication factors associated with high stringency levels can raise the likelihood that the security system 110 will successfully authenticate a user and/or device that is in-fact authorized, there are some disadvantages to requiring these high stringency authentication factors at every authentication. In particular, inputting high stringency authentication factors can cause a significant interruption to a user and/or device. For example, a user who is prompted to scan their retina at multiple reauthentications over the course of a workday may find the experience relatively invasive and distracting. Thus, these high stringency authentication factors may be associated with a lower user experience than some lower stringency authentication factors. Accordingly, it may be advantageous for the security system 110 to request relatively low stringency authentication factors when the security system 110 has little reason to suspect that the device is being operated by an unauthorized user.

In various implementations of the present disclosure, the security system 110 may adjust a security policy associated with the primary device 106 accessing the remote resource 104 based on the physical location of the primary device 106 and/or the identity of endpoints connected to the primary device 106. For instance, the security system 110 may adjust the reauthentication interval associated with the primary device 106, select authentication factors for authenticating the primary device 106, or the like, based on these considerations.

In some cases, the security system 110 maintains a trust score associated with the primary device 106. As used herein, the term "trust score," and its equivalents may refer to a metric that is indicative of a likelihood that a device has not been compromised and/or the device is operated by an authorized user. A trust score may be negatively correlated (e.g., inversely proportional) to the security risk that a device poses to a secured resource (e.g., to the remote resource 104). The security system 110 may adjust the trust score of the primary device 106 based on the physical location of the primary device 106 and/or the identity of endpoints connected to the primary device 106.

In particular cases, the security system 110 may set the security policy associated with the primary device 106 based on the trust score of the primary device 106. In some implementations, the security system 110 may determine the reauthentication interval associated with the primary device 106, select an authentication factor for authenticating the primary device 106, or the like, based on the trust score. For instance, the security system 110 may set a relatively short reauthentication interval (e.g., a reauthentication interval that is shorter than a default reauthentication interval) if the security system 110 determines that the trust score is less than a first threshold. In some examples, the security system 110 may set a relatively long reauthentication interval (e.g., a reauthentication interval that is longer than the default reauthentication interval) if the security system 110 determines that the trust score is greater than the first threshold. In some cases, the security system 110 may select a relatively stringent authentication factor (e.g., a biometric factor) if the trust score is less than a second threshold. In some examples, the security system 110 may select a relatively nonstringent authentication factor (e.g., a code) if the trust score is greater than the second threshold.

In some examples, the security system 110 may adjust the security policy and/or the trust score associated with the primary device 106 based on a physical proximity between the primary device 106 and a nearby device 115 that is associated with a nearby user 116, wherein the nearby device 115 and/or the nearby user 116 are authenticated by the security system 110.

As used herein, the term "physical proximity," and its equivalents, may refer to a distance between two entities and/or whether the entities are both located in a particular area. For example, two devices may be physically proximate to one another if they are located within a threshold distance (e.g., one meter, two meters, three meters, etc.) of one another. In some instances, two devices may be physical proximate to one another if they are located within the same room, the same building, the same physical workplace, the same work campus, the same coverage area, or the like. In various implementations, the physical proximity is a physical distance between the primary device 106 and the nearby device 115. For instance, the physical proximity of the primary device 106 and the nearby device 115 may correspond to whether the primary device 106 and the nearby device 115 are located within a threshold distance (e.g., 1 meter (m), 2 m, 3 m, 4 m, or 5 m) of one another. In some cases, the security system 110 determines the distance between the primary device 106 and the nearby device 115 by determining locations of the primary device 106 and the nearby device 115. For example, the primary device 106 and/or the nearby device 115 may determine their locations (e.g., using the Global Position System (GPS)) and transmit one or more messages indicating their locations to the security system 110. The security system 110 may calculate the distance between the primary device 106 and the nearby device 115 based on the locations and compare the distance to the threshold distance.

In some cases, the physical proximity of the primary device 106 and the nearby device 115 may correspond to whether the primary device 106 and/or the primary user 102 are within line-of-sight of the nearby device 115 and/or the nearby user 116. As used herein, the term "line-of-sight," and its equivalents, may refer to an absence of physical impediments (e.g., walls, buildings, trees, and so on) along a straight line connecting two entities. In some examples, the primary device 106 and the nearby device 115 exchange at least one first message over a wireless connection (e.g., a Near Field Communication (NFC) connection, a BLUETOOTH connection, or some other wireless connection with a finite range) and transmit a second message to the security system 110 indicative of the first message(s). The first message(s) may be indicative of the primary device 106 and the nearby device 115 are within line-of-sight of one another and/or indicative of the distance between the primary device 106 and the nearby device 115 being within the range of the wireless connection.

In some implementations, the physical proximity corresponds to the presence of the primary device 106 and the nearby device 115 in the same physical location 118. According to various examples, the physical location 118 may include the AP(s) 111 used to connect the In some implementations, the physical proximity of the primary device 106 and the nearby device 115 may correspond to whether the primary device 106 and the nearby device 115 are located in the same coverage area of the AP(s) 111 (e.g., whether the primary device and the nearby device 115 are connected to the same AP 111). For instance, the AP(s) 111 may transmit one or more messages to the security system 110 that are indicative of the primary device 106 and the nearby device 115 being wirelessly attached to, exchanging data with, or otherwise being connected to the AP(s) 111. In some examples, the message(s) further identify the AP(s) 111 and the security system 110 may identify the locations of the AP(s) 111 based on a map or other indication stored at the security system 110 of predetermined locations of the AP(s) 111.

In various implementations, the physical proximity between the primary device 106 and the nearby device 115 may be at least partly indicative of the primary device 106 being operated by the primary user 102. For example, the physical location 118 may be a workplace of the primary user 102 and the nearby user 116. In the physical location 118, the unauthorized user 112 may be unable to use the primary device 106 without being noticed by the nearby user 116. The nearby user 116 may, for example, see the unauthorized user 112 attempting to use the primary device 106 of the primary user 102, recognize that the unauthorized user 112 is not the primary user 102, and report the unauthorized user 112 to authorities. Thus, the security system 110 may use the physical proximity between the primary device 106 and the nearby device 115 and/or nearby user 116 as at least one consideration in setting a security policy with respect to the primary device 106 accessing the remote resource 104.

The security policy may be adjusted in various ways based on the physical proximity of the primary device 106 and the nearby device 115. In some examples, the security system 110 may reduce the trust score of the primary device 106 and/or set the trust score to be relatively small (e.g., less than a default trust score) based on the primary device 106 and the nearby device 115 being located greater than a threshold distance from each other, the primary device 106 and/or the nearby device 115 not being located in the physical location 118, the primary device 106 and the nearby device 115 not being within line-of-sight of one another, the primary device 106 and the nearby device 115 not being located within the same coverage area of the AP(s) 111, or any combination thereof. In some cases, the security system 110 may increase the trust score of the primary device 106 and/or set the trust score to be relatively large (e.g., greater than the default trust score) based on the primary device 106 and the nearby device 115 being located less than a threshold distance from each other, the primary device 106 and/or the nearby device 115 being located in the physical location 118, the primary device 106 and the nearby device 115 being within line-of-sight of one another, the primary device 106 and the nearby device 115 being located within the same coverage area of the AP(s) 111, or any combination thereof.

In some cases, the security system 110 sets and/or adjusts the reauthentication interval of the primary device 106 based on the physical proximity of the primary device 106 and the nearby device 115. For instance, the security system 110 may apply a relatively short reauthentication interval (e.g., one hour) and/or shorten the reauthentication interval based on the primary device 106 and the nearby device 115 being located greater than a threshold distance from each other, the primary device 106 and/or the nearby device 115 not being located in the physical location 118, the primary device 106 and the nearby device 115 not being within line-of-sight of one another, the primary device 106 and the nearby device 115 not being located within the same coverage area of the AP(s) 111, or any combination thereof. In various examples, the security system 110 may apply a relatively long reauthentication interval (e.g., eight hours) and/or lengthen the reauthentication interval based on the primary device 106 and the nearby device 115 being located within the threshold distance of each other, the primary device and/or the nearby device 115 being located in the physical location 118, the primary device 106 and the nearby device 115 being within line-of-sight of one another, the primary device 106 and the nearby device 115 being located within the same coverage area of the AP(s) 111, or any combination thereof.

In some cases, the security system 110 sets and/or adjusts one or more authentication factors for authenticating the primary device 106 based on the physical proximity of the primary device 106 and the nearby device 115. For example, the security system 110 may select a relatively stringent authentication factor (e.g., a biometric factor) based on the primary device 106 and the nearby device 115 being located greater than a threshold distance from each other, the primary device 106 and/or the nearby device 115 not being located in the physical location 118, the primary device 106 and the nearby device 115 not being within line-of-sight of one another, the primary device 106 and the nearby device 115 not being located within the same coverage area of the AP(s) 111, or any combination thereof. In various examples, the security system 110 may select a relatively nonstringent authentication factor (e.g., a code) based on the primary device 106 and the nearby device 115 being located within the threshold distance of each other, the primary device and/or the nearby device 115 being located in the physical location 118, the primary device 106 and the nearby device 115 being within line-of-sight of one another, the primary device 106 and the nearby device 115 being located within the same coverage area of the AP(s) 111, or any combination thereof.

In some examples, the security system 110 adjusts the trust score and/or security policy of the primary device 106 based on the number of previously authenticated devices and/or users within physical proximity of the primary device 106. For example, if multiple nearby devices 115 are within a threshold distance of the primary device 106, within line-of-sight of the primary device 106, within the physical location 118 with the primary device 106, connected to the same AP(s) 111 as the primary device 106, or a combination thereof, the security system 110 may increase the trust score by a larger amount and/or set the trust score to a higher level than if only a single nearby device 115 is within the threshold distance of the primary device 106, within line-of-sight of the primary device 106, within the physical location 118 with the primary device 106, connected to the same AP(s) 111 as the primary device, or a combination thereof. For example, the security system 110 may increase the trust score by an amount that is positively correlated to (e.g., proportional to) the number of nearby devices 115 associated with the primary device 106.

In various implementations, the security system 110 may adjust the security policy and/or the trust score associated with the primary device 106 based on a virtual proximity between the primary device 106 and a remote device 122 that is associated with a remote user 120, wherein the remote device 122 and/or the remote user 120 are authenticated by the security system 110. As used herein, the term "logical proximity," and its equivalents, may refer to whether two entities are connected to one another in an ongoing communication session. In the example illustrated in FIG. 1, the primary user 102 may be communicating with the remote user 120 based on data being exchanged between the primary device 106 and the remote device 122 in a communication session. As used herein, the terms "communication session," "session," and their equivalents, may refer to a transfer of data between devices, wherein the data is indicative of a conversation or other communication between users of the devices. For example, data indicative of a communication between the primary user 102 and the remote user 120 is transmitted from the primary device 106 to the remote device 122. The data may be transmitted over the AP(s) 111 and the communication network(s) 108. Examples of communication sessions include, for instance, voice calls (e.g., conference calls), video calls (e.g., video conferences), instant messaging sessions, text sessions, and the like.

In various implementations, the virtual proximity between the primary device 106 and the remote device 122 may be at least partly indicative of the primary device 106 being operated by the primary user 102. For example, if the primary user 102 is visible to the remote user 120 in a video conference between the primary device 106 and the remote device 122, then there is a relatively high likelihood that the primary device 106 is in-fact being operated by the primary user 102. However, if the unauthorized user 112 is visible to the remote user 120 in the video conference, then the unauthorized user 112 may be more likely to end the communication session and report the presence of the unauthorized user 112 to authorities. Thus, the security system 110 may use the virtual proximity between the primary device 106 and the remote device 122 and/or remote user 120 as at least one consideration in setting a security policy with respect to the primary device 106 accessing the remote resource 104.

The security system 110 may determine that the primary device 106 and the remote device 122 are in a communication session using any of a variety of techniques. For example, the security system 110 may receive one or more messages from the primary device 106 and/or the remote device 122 indicating the communication session. In some cases, the security system 110 receives one or more messages from an external resource configured to transfer data between the primary device 106 and the remote device 122 in the communication session and/or manage the communication session. For example, the remote resource 104 may be configured to manage the communication session between the primary device 106 and the remote device 122.

The security policy may be adjusted in various ways based on the virtual proximity of the primary device 106 and the nearby device 115. In some examples, the security system 110 may reduce the trust score of the primary device 106 and/or set the trust score to be relatively small (e.g., less than a default trust score) based on the primary device 106 not being in a communication session with the previously authenticated remote device 122. In some cases, the security system 110 may increase the trust score of the primary device 106 and/or set the trust score to be relatively large (e.g., greater than the default trust score) based on the primary device 106 being in a communication session with the previously authenticated remote device 122.

In some cases, the security system 110 sets and/or adjusts the reauthentication interval of the primary device 106 based on the virtual proximity of the primary device 106 and the remote device 122. For instance, the security system 110 may apply a relatively short reauthentication interval (e.g., one hour) and/or shorten the reauthentication interval based on the primary device 106 and the remote device 122 not being in a communication session. In various examples, the security system 110 may apply a relatively long reauthentication interval (e.g., eight hours) and/or lengthen the reauthentication interval based on the primary device 106 and the remote device 122 being in a communication session.

In some cases, the security system 110 sets and/or adjusts one or more authentication factors for authenticating the primary device 106 based on the virtual proximity of the primary device 106 and the remote device 122. For example, the security system 110 may select a relatively stringent authentication factor (e.g., a biometric factor) based on the primary device 106 and remote device 122 not being in a communication session. In various examples, the security system 110 may select a relatively nonstringent authentication factor (e.g., a code) based on the primary device 106 and the remote device 122 being in a communication session.

In some examples, the security system 110 adjusts the trust score and/or security policy of the primary device 106 based on the number of previously authenticated devices and/or users within virtual proximity of the primary device 106. For example, if multiple remote devices 122 are in one or more communication sessions with the primary device 106, the security system 110 may increase the trust score by a larger amount and/or set the trust score to a higher level than if only a single remote device 122 is in a communication session with the primary device 106. For example, the security system 110 may increase the trust score by an amount that is positively correlated to (e.g., proportional to) the number of remote devices 122 in one or more active communication sessions with primary device 106.

In various implementations, the security system 110 may adjust the security policy and/or the trust score associated with the primary device 106 based on a communication from an independent device 124 configured to monitor the primary user 102, the primary device 106, and/or the unauthorized user 112. As used herein, the term "independent device," and its equivalents, refers to a device that is different than a device accessing and/or seeking to access a secured resource and is unassociated with a user of the device accessing and/or seeking to access the secured resource. For example, an independent device is not a primary device or a secondary device. In particular cases, the independent device 124 may include an input device (e.g., a camera and/or a microphone) located in the physical location 118. An example of an independent device 124 may be a security camera or conference room camera installed in a workplace of the primary user 102. The independent device 124 may be configured to generate data that is indicative of whether the primary device 106 is being utilized by the primary user 102. For instance, the independent device 124 may capture an image and/or video of the primary user 102 utilizing the primary device 106, the independent device 124 may capture audio of the primary user 102 within a threshold distance of the location of the primary device 106, or the like. According to some implementations, the independent device 124 may transmit, to the security system 110, a message indicating the data captured by the independent device 124.

In some cases, the security system 110 may be configured to recognize the presence of the primary user 102 based on the message from the independent device 124. For instance, the security system 110 may recognize the primary user 102 in an image captured by the independent device 124 using facial recognition, the security system 110 may recognize the primary device 106 in the image using object recognition, the security system 110 may recognize a voice of the primary user 102 in audio captured by the independent device 124 using voice recognition, or a combination thereof. Alternatively, the independent device 124 may recognize the primary user 102 in an image captured by the independent device 124 using facial recognition, the independent device 124 may recognize the primary device 106 in the image using object recognition, the independent device 124 may recognize a voice of the primary user 102 in audio captured by the independent device 124 using voice recognition, or a combination thereof, and the independent device 124 may indicate the presence of the primary user 102 near the independent device 124 upon recognizing both the primary user 102 and the independent device 124. By recognizing the presence of the primary user 102 using the primary device 106, the security system 110 may have evidence that the primary device 106 is used by the primary user 102 and can adjust the security policy associated with the primary device 106 accordingly. Alternatively, by recognizing that the primary user 102 is not using the primary device 106, or that the unauthorized user 112 is using the primary device 106, the security system 110 may adjust the security policy to prevent the primary device 106 from accessing the remote resource 104.

The security policy may be adjusted in various ways based on the detection by the independent device 124. In some examples, the security system 110 may reduce the trust score of the primary device 106 and/or set the trust score to be relatively small (e.g., less than a default trust score) based on the independent device 124 being unable to detect the primary user 102 using the primary device 106 and/or the independent device 124 detecting the unauthorized user 112 using the primary device 106. In some cases, the security system 110 may increase the trust score of the primary device 106 and/or set the trust score to be relatively large (e.g., greater than the default trust score) based on the independent device 124 detecting the primary user 102 using the primary device and/or not detecting the unauthorized user 112 using the primary device 106.

In some cases, the security system 110 sets and/or adjusts the reauthentication interval of the primary device 106 based on whether or not the independent device 124 detects the primary user 102 with the primary device 106. For instance, the security system 110 may apply a relatively short reauthentication interval (e.g., one hour) and/or shorten the reauthentication interval based on the primary user 102 and/or the primary device 106 not being detected by the independent device 124 and/or the unauthorized user 112 being detected by the independent device 124. In various examples, the security system 110 may apply a relatively long reauthentication interval (e.g., eight hours) and/or lengthen the reauthentication interval based on the primary user 102 and/or the primary device 106 being detected by the independent device 124 and/or the unauthorized user 112 not being detected by the independent device 124.

In some cases, the security system 110 sets and/or adjusts one or more authentication factors for authenticating the primary device 106 based on whether or not the independent device 124 detects the primary user 102 with the primary device 106. For example, the security system 110 may select a relatively stringent authentication factor (e.g., a biometric factor) based on the primary user 102 and/or the primary device 106 not being detected by the independent device 124 and/or the unauthorized user 112 being detected by the independent device 124. In various examples, the security system 110 may select a relatively nonstringent authentication factor (e.g., a code) based on the primary user 102 and/or the primary device 106 being detected by the independent device 124 and/or the unauthorized user 112 not being detected by the independent device 124.

Although various examples described herein relate to adjusting a security policy associated with authenticating the primary user 102 and/or the primary device 106, implementations are not so limited. In some examples, the security system 110 may adjust a security policy associated with a firewall of the remote resource 104 based on the physical and/or virtual proximity of the primary device 106. For instance, based on recognizing that the primary device 106 is in physical proximity with the nearby device 115 and/or that the primary device is in virtual proximity with the remote device 122, the security system 110 may control a firewall to selectively enable the primary device 106 to transmit a particular type of data to the remote resource 104 and/or to receive a particular type of data from the remote resource 104. In some cases, based on recognizing that the independent device 124 has confirmed the presence of the primary user 102 with the primary device 106, the security system 110 may control the firewall to selectively enable the primary device 106 to transmit the particular type of data to the remote resource 104 and/or to receive the particular type of data from the remote resource 104.

Figure 2:
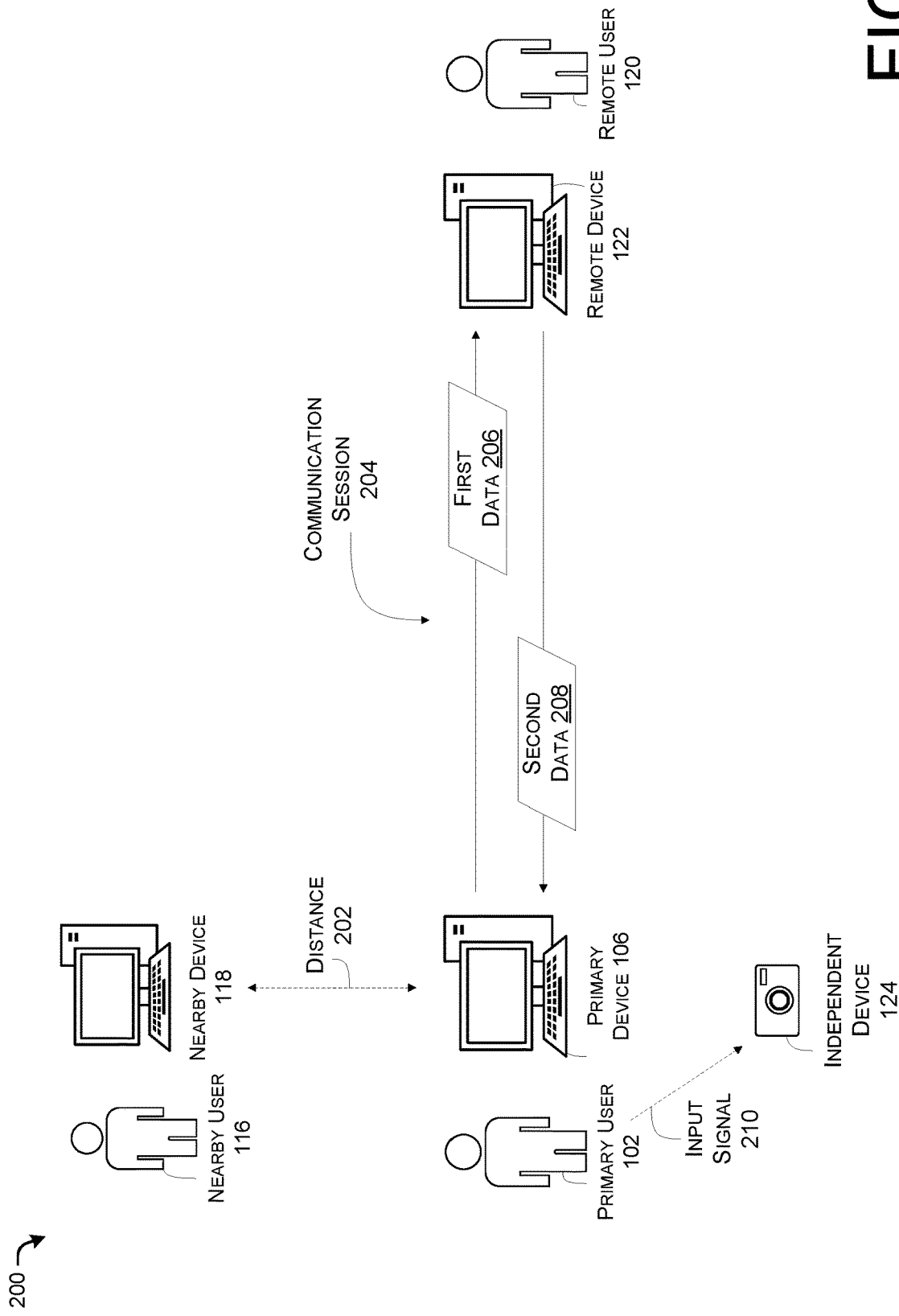
FIG. 2 illustrates an example environment showing various considerations that can be used to adjust a security policy.

FIG. 2 illustrates an example environment 200 showing various considerations that can be used to adjust a security policy. As shown, the environment 200 includes the primary user 102, the primary device 106, the nearby user 116, the nearby device 115, the remote user 120, the remote device 122, and the independent device 124 described above with reference to FIG. 1. The policy may be associated with the primary device 106 accessing a remote resource (e.g., the remote resource 104 described above with reference to FIG. 1) and adjusted by a security system (e.g., the security system 110 described above with reference to FIG. 1).

An example consideration that can be used to adjust the security policy relates to the physical proximity between the primary device 106 and the (authenticated) nearby device 115. In particular examples, a distance 202 between the primary device 106 and the nearby device 115 may be indicative of the physical proximity between the primary device 106 and the nearby device 115. If the distance 202 between the primary device 106 and the nearby device 115 is less than a threshold distance, then the security system may be more likely to trust that the primary device 106 is being used by the authorized, primary user 102. For example, the threshold distance may be 1 m, 2 m, 3 m, 4 m, or some other finite distance. In some cases, the threshold distance may be a width of a coverage area of one or more APs connected to the primary device 106 and the nearby device 115. In some implementations, the threshold distance may be a width of a room, a building, a hallway, or other defined space that contains the nearby device 115 and the primary device 106. In some cases, if the distance 202 is greater than the threshold distance, the security system may be less likely to trust that the primary device 106 is being utilized by the authorized, primary user 102.

Another example consideration that can be used to adjust the security policy relates to the virtual proximity between the primary device 106 and the (authenticated) remote device 122. As shown in FIG. 2, there may be an active communication session 204 between the primary device 106 and the remote device 122. In the communication session 204, the primary device 106 may transmit first data 206 to the remote device 122 and the remote device 122 may transmit second data 208 to the primary device 106. The first data 206 and the second data 208 may be indicative of a conversation or some other communication between the primary user 102 and the remote user 120. For example, the first data 206 and the second data 208 may indicate a video conference, a voice call, an instant messaging session, or the like, between the primary user 102 and the remote user 120. In various implementations, the existence of the communication session 204 between the primary device 106 and the remote device 122 may make the security system more likely to trust that the primary device 106 is being operated by the authorized, primary user 102, as compared to a scenario in which the primary device 106 is not in a communication session with another authenticated device.

A further example consideration that can be used to adjust the security policy relates to a detection of the primary user 102 by the independent device 124. For example, the independent device 124 may receive an input signal 210 from the primary user 102. The input signal 210 may include light or sound from the primary user 102. In some cases, the input signal 210 may further be indicative of the primary device 106 near (e.g., within a threshold distance, such as 1 m, of) the primary user 102. For example, the independent device 124 may capture an image, a video, an audio recording, or the like, of the primary user 102. Based on the input signal 210 received by the independent device 124, the primary user 102 can be detected as present with the primary device 106 and presumed to be using the primary device 106. In various implementations, the presence of the primary user 102 may make the security system more likely to trust that the primary device 106 is being operated by the authorized, primary user 102, as compared to a scenario in which the presence of the primary user 102 is unconfirmed by the independent device 124.

The security system may implement, based on the trustworthiness that the primary device 106 is being operated by the authorized, primary user 102, a security policy for access of a remote resource by the primary device 106. In some examples, the security system may determine a trust score associated with the primary device 106 based on any of the considerations described herein. The trust score, in some cases, is a metric that is positively correlated with the likelihood that the primary device 106 is being operated by the primary user 102. For example, the security system may increase the trust score if any of the considerations indicate that that the primary device 106 is being operated by the primary user 102 and may decrease the trust score if any of the considerations indicate that the primary device 106 is not being operated by the primary user 102. In some examples, the security system may implement a first security policy if the trust score is greater than a threshold and a second security policy if the trust score is less than the threshold. For instance, the security system may apply a first reauthentication interval and/or request a first authentication factor if the trust score is greater than the threshold, and may apply a second reauthentication interval and/or request a second authentication factor if the trust score is less than the threshold, wherein the first reauthentication interval is longer than the second reauthentication interval and the first authentication factor is more stringent than the second authentication factor.

Figure 3:
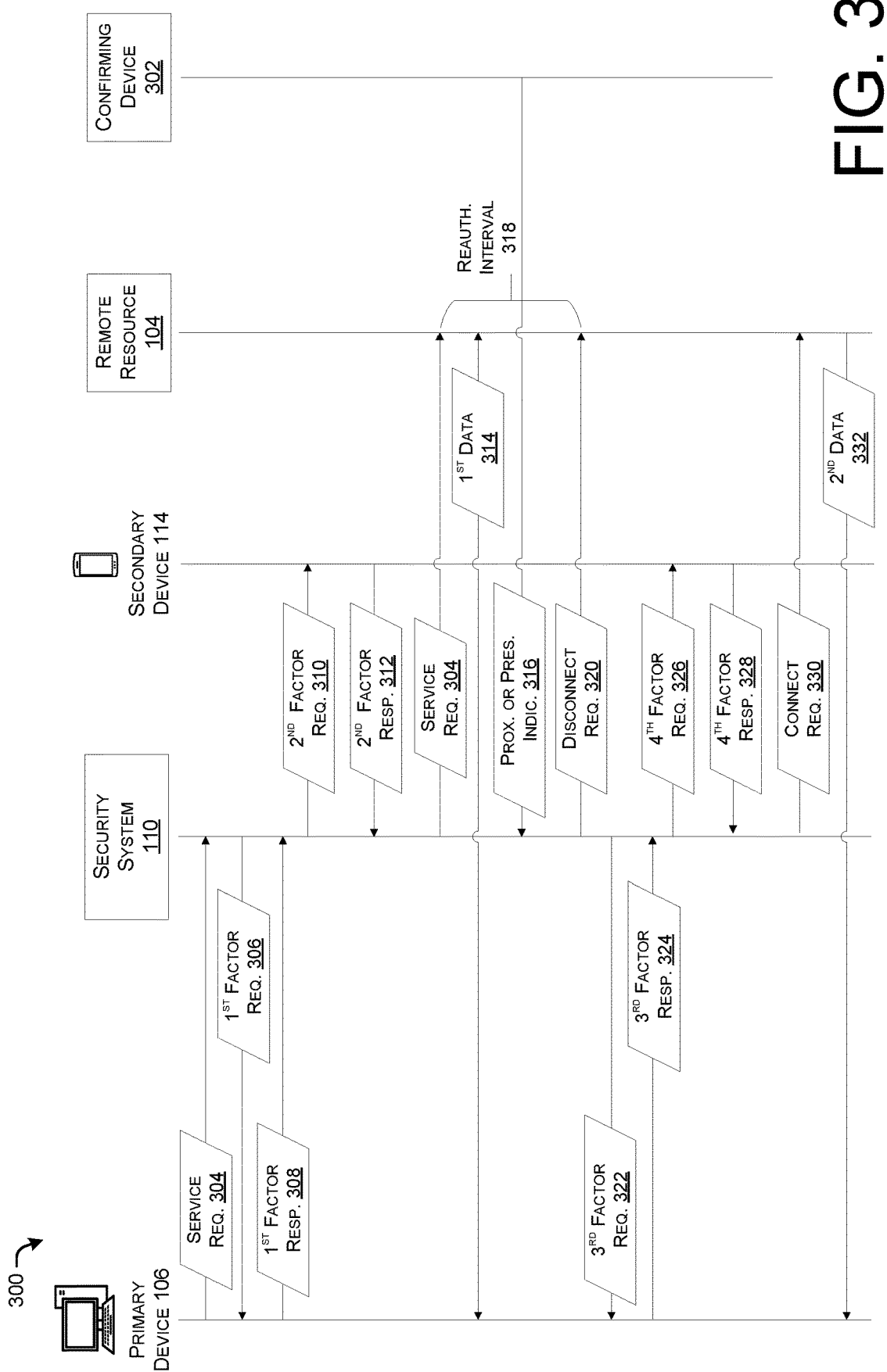
FIG. 3 illustrates example signaling for implementing enhanced multi-factor authentication based on proximity and/or presence.

FIG. 3 illustrates example signaling 300 for implementing enhanced MFA based on the physical and/or virtual proximity of the primary device 106. As shown, the signaling 300 is between the primary device 106, the security system 110, the secondary device 114, and the remote resource 104, which are described above with reference to FIG. 1. In addition, the signaling 300 involves a confirming device 302. Examples of the confirming device 302 include, for instance, the AP(s) 111, the nearby device 115, the remote device 122, the independent device 124, or a combination thereof. In some implementations, the confirming device 302 may include the primary device 106, the secondary device 114, or the remote resource 104. Various messages in the signaling 300 include one or more data packets and/or datagrams transmitted over one or more wired communication networks, one or more wireless communication networks, or a combination thereof.

The primary device 106 may transmit a service request 304 that is received and/or intercepted by the security system 110. The service request 304 may be a request to access the remote resource 104. For example, the service request 304 may include a request for data (e.g., sensitive data) from the remote resource 104 and/or to transmit data to the remote resource 104. The security system 110 may refrain from forwarding the service request 304 to the remote resource 104 until the primary device 106 and/or a user of the primary device 106 is authenticated.

The security system 110 may transmit a first factor request 306 to the primary device 106. The first factor request 306 may include a request for a first authentication factor. The first authentication factor, for example, may be a password or PIN.

The primary device 106 may transmit a first factor response 308 to the security system 110. In some cases, the user of the primary device 106 may input the first authentication factor into the primary device 106 For example, the primary device 106 may receive a password or other type of code entered by the user (e.g., using a keyboard), the primary device 106 may scan the fingerprint of the user, the primary device 106 may scan a retina or iris of the user, the primary device 106 may record a voice of the user, or the like. In various implementations, the first factor response 308 includes the requested first authentication factor. For example, the user of the primary device 106 may have entered the first authentication factor into the primary device 106, the primary device 106 may have otherwise received the first authentication factor from the user, the primary device 106 may have generated the first authentication factor, or a combination thereof.

The security system 110 may transmit a second factor request 310 to the secondary device 114. The second factor request 310 may include a request for a second authentication factor. The second authentication factor, for example, may be confirmation of receiving a push notification. In various examples, the second authentication factor may be different than the first authentication factor.

The secondary device 114 may transmit a second factor response 312 to the security system 110. For example, the user of the primary device 106 may have entered the second authentication factor into the secondary device 114, the secondary device 114 may have otherwise received the second authentication factor from the user, the secondary device 114 may have generated the second authentication factor, or a combination thereof.

Upon receiving the first authentication factor and the second authentication factor, the security system 110 may forward the service request 304 to the remote resource 104. Based on the service request 304, the primary device 106 may exchange first data 314 with the remote resource 104. For example, the primary device 106 may transmit data to the remote resource 104, may receive data from the remote resource 104, or both. The first data 314 includes sensitive data, in some examples.

In addition, the confirming device 302 may transmit a presence indicator 316 to the security system 110. In various cases, the confirming device 302 may be a device that is separate from the primary device 106 and the secondary device 114. The confirming device 302 may be configured to independently confirm the proximity of the primary device 106 to one or more other authenticated devices and/or to independently confirm the presence of the authorized user of the primary device 106 in the vicinity of the primary device 106.

In some cases, the proximity or presence indicator 316 informs the security system 110 of the physical proximity between the primary device 106 and one or more other devices that have been currently and/or previously authenticated by the security system 110. In some cases, the confirming device 302 is an authenticated device and the proximity or presence indicator 316 indicates the location of the authenticated device, which the security system 110 may compare to a location of the primary device 106. In some cases, the proximity or presence indicator 316 indicates that the confirming device 302 has communicated with the primary device 106 over a wireless communication link with a finite range (e.g., an NFC link, a BLUETOOTH link, or the like). According to some implementations, the confirming device 302 is one or more APs and the proximity or presence indicator 316 indicates that the AP(s) have established wireless connections with the primary device 106 and/or one or more previously and/or currently authenticated devices. In various cases, the security system 110 may determine the physical proximity between the primary device 106 based on the proximity or presence indicator 316 by determining whether the primary device 106 is within a threshold distance of the previously and/or currently authenticated device(s), whether the primary device 106 is within line-of-sight of the previously and/or currently authenticated device(s), whether the primary device 106 is within the same coverage area as the previously and/or currently authenticated device(s), whether the primary device 106 is within the same building or other finite space as the previously and/or currently authenticated device(s), or a combination thereof.

In some implementations, the proximity or presence indicator 316 informs the security system 110 of the virtual proximity between the primary device 106 and one or more devices that are currently and/or have been previously authenticated by the security system 110. For example, the confirming device 302 may include an authenticated device that is in a communication session with the primary device 106. In some examples, the confirming device 302 is a server or some other type of device configured to manage and/or transfer data in the communication session. The proximity or presence indicator 316 may indicate the communication session to the security system 110.

In some cases, the proximity or presence indicator 316 informs the security system whether the authorized user of the primary device 106 has been observed using the primary device 106. In some cases, the confirming device 302 is an independent device that includes an input device configured to receive an input signal from the authorized user or any other user utilizing the primary device 106. For example, the confirming device 302 may take a picture of whoever is using the primary device 106, the confirming device 302 may capture audio of whoever is using the primary device 106, or the like. The proximity or presence indicator 316 may indicate whether the authorized user is using the primary device 106.

Upon expiration of a reauthentication interval 318, the security system 110 may transmit a disconnect request 320 to the remote resource 104. The reauthentication interval 318 may extend between the time at which the security system 110 forwarded the service request 304 to the remote resource 104 and the time at which the security system 110 transmits the disconnect request 320 to the remote resource 104. The disconnect request 320 may include an instruction for the remote resource 104 to cease sending the first data 314 to the primary device 106 and/or receiving the first data 314 from the primary device 106. Based on receiving the disconnect request 320, the remote resource 104 may cease exchanging the first data 314 with the primary device 106.

In various implementations, the security system 110 may determine the length of the reauthentication interval 318 based on the proximity of the primary device 106 to one or more other authenticated devices and/or detection of the presence of the authorized user (e.g., by an independent device). For example, the reauthentication interval 318 may have a first length (e.g., shorter than a default authentication interval) if the security system 110 is unable to determine that the primary device 106 is in physical and/or virtual proximity to other authorized device(s). In some cases, the reauthentication interval may have a second length (e.g., longer than the default authentication interval) if the security system 110 is able to determine that the primary device 106 is in physical and/or virtual proximity to other authorized device(s). In some implementations, the reauthentication interval 318 may have the first length if the security system 110 is unable to confirm that the authorized user is observed, by the independent device, using the primary device 106. In contrast, the reauthentication interval 318 may have the second length if the security system 110 is able to confirm that the authorized user is observed, by the independent device, using the primary device 106.

The security system 110 may trigger reauthentication of the primary device 106 by transmitting a third factor request 322 to the primary device 106. The third factor request 322 may include a request for a third authentication factor. In various examples, the security system 110 may select the third authentication factor based on the proximity of the primary device 106 to one or more other authenticated devices and/or detection of the presence of the authorized user (e.g., by an independent device). For instance, the security system 110 may select the third authentication factor to be of a higher stringency than the first authentication factor or the second authentication factor if the primary device 106 is not observed to be physically and/or virtually proximate to any other authenticated devices. In some cases, the security system 110 may select the third authentication factor to be of a higher stringency than the first authentication factor or the second authentication factor if the independent device is unable to confirm that the authorized user is present with the primary device 106. Alternatively, the security system 110 may select the third authentication factor to be of the same or of a less-stringent type as the first authentication factor or the second authentication factor based on determining that one or more authenticated devices are physically and/or virtually proximate to the primary device 106 or that the independent device is able to independently confirm that the authorized user is present with the primary device 106.

The primary device 106 may transmit a third factor response 324 to the security system 110. The third factor response 324 may include the third authentication factor. For example, the user of the primary device 106 may have entered the third authentication factor into the primary device 106, the primary device 106 may have otherwise received the third authentication factor from the user, the primary device 106 may have generated the third authentication factor, or a combination thereof.

The security system 110 may transmit a fourth factor request 326 to the secondary device 114. The fourth factor request 326 may include a request for a fourth authentication factor. In various examples, the security system 110 may select the fourth authentication factor based on the proximity of the primary device 106 to one or more other authenticated devices and/or detection of the presence of the authorized user (e.g., by an independent device). For instance, the security system 110 may select the fourth authentication factor to be of a higher stringency than the first authentication factor or the second authentication factor if the primary device 106 is not observed to be physically and/or virtually proximate to any other authenticated devices. In some cases, the security system 110 may select the fourth authentication factor to be of a higher stringency than the first authentication factor or the second authentication factor if the independent device is unable to confirm that the authorized user is present with the primary device 106. Alternatively, the security system 110 may select the fourth authentication factor to be of the same or of a less-stringent type as the first authentication factor or the second authentication factor based on determining that one or more authenticated devices are physically and/or virtually proximate to the primary device 106, determining that the independent device is able to independently confirm that the authorized user is present with the primary device 106, or a combination thereof.

The secondary device 114 may transmit a fourth factor response 328 to the security system 110. The fourth factor response 328 may include the third authentication factor. For example, the user of the primary device 106 may have entered the fourth authentication factor into the secondary device 114, the secondary device 114 may have otherwise received the fourth authentication factor from the user, the secondary device 114 may have generated the fourth authentication factor, or a combination thereof.

In various cases, the security system 110 may reauthenticate the user and/or the primary device 106 based on receiving the third factor response 324 and the fourth factor response 329. Upon reauthenticating the user and/or the primary device 106, the security system 110 may transmit a connection request 330 to the remote resource 104. Upon receiving the connection request 330, the remote resource 104 may exchange second data 332 with the primary device 106. For example, the primary device 106 may transmit the second data 332 to the remote resource 104, the primary device 106 may receive the second data 332 from the remote resource 104, or a combination thereof.

Although not specifically illustrated in FIG. 3, the security system 110 can reauthenticate the primary device 106 and/or the user more than once. In some cases, the security system 110 may block the primary device 302 from exchanging data with the remote resource 104 if the security system 110 is unable to authenticate the primary device 106 and/or user. Further, although FIG. 3 illustrates an example in which the security system 110 requests the second authentication factor and the fourth authentication factor from the secondary device 114, and the secondary device 114 provides the second authentication factor and the fourth authentication factor to the security system 110, implementations are not so limited. For example, in some implementations, the security system 110 may transmit the second factor request 310 to the primary device 106, may receive the second factor response 312 from the primary device 106, may transmit the fourth factor request 326 to the primary device 106, may receive the fourth factor response 328 from the primary device 106, or any combination thereof.

Figure 4:
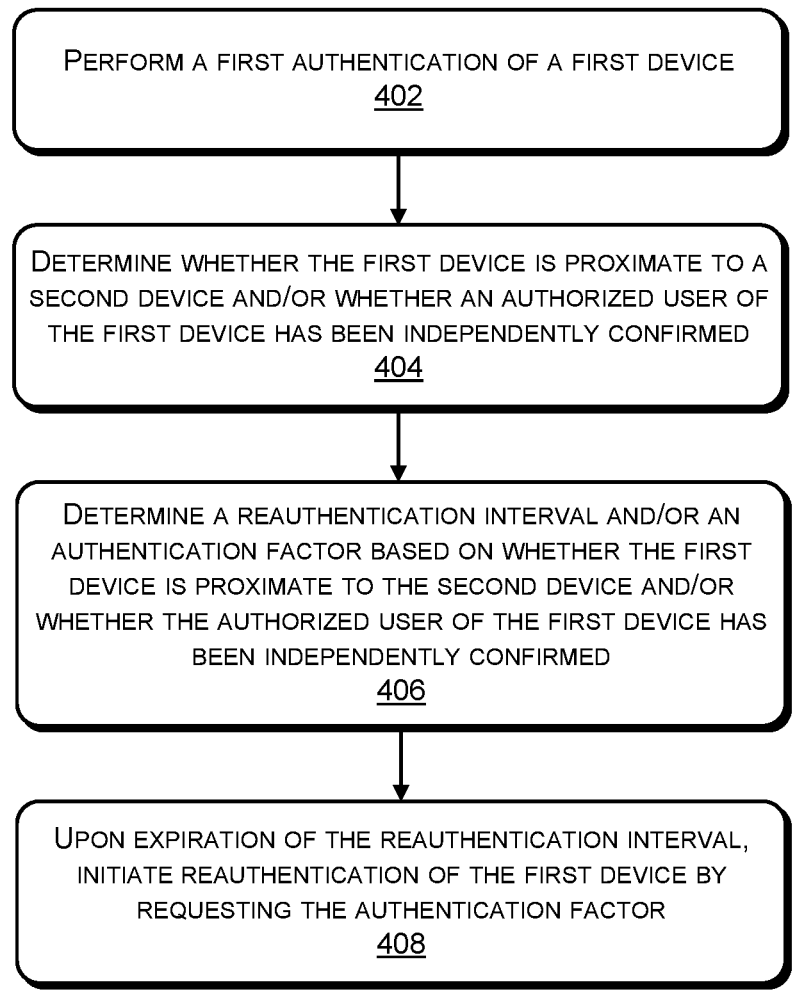
FIG. 4 illustrates an example process for performing enhanced reauthentication for a device based on the proximity of the device to authenticated devices and/or independently confirmed presence of an authorized user of the device.

FIG. 4 illustrates an example process 400 for performing enhanced reauthentication for a device based on the proximity of the device to authenticated devices and/or independently confirmed presence of an authorized user of the device. In various implementations, the process 400 may be performed by an entity, such as the security system 110 described above with reference to FIG. 1.

At 402, the entity performs authentication of a first device. The first device, for example, may be a primary device associated with an authorized user. For example, an indicator of the primary device and the authorized user may be registered (e.g., stored) with the entity prior to performance of the process 400. In some examples, the entity performs the authentication by performing MFA. For instance, the entity may transmit a request for a first authentication factor to the first device, receive the first authentication factor from the first device, transmit a request for a second authentication factor to the first device or another device associated with the authorized user, and receive the second authentication factor from the first device or the other device. In various examples, the entity performs the first authentication at a first time. In some examples, upon performing the authentication, the entity may enable the first device to access a resource, such as a remote and/or secured resource. For instance, the first device may be configured to transmit data to and/or receive data from the resource after the authenticated is performed.

At 404, the entity determines whether the first device is proximate to a second device and/or whether an authorized user of the first device has been independently confirmed. The second device, for example, is a device that is authenticated by the entity and is not deauthenticated by the entity. In some examples, the second device has been reauthenticated by the entity. For instance, the entity may enable the second device to access the resource. In some examples, the entity may determine whether the first device is physically proximate to the second device. In some cases, the entity may determine whether the first device is located within a threshold distance of the second device, whether the first device is within a line-of-sight of the second device, whether the first device is connected to the same wireless AP as the second device, whether the first device is in the same finite space (e.g., building, room, hallway, or the like) as the second device, or any combination thereof. According to some examples, the entity may determine whether the first device is virtually proximate to the second device. For instance, the entity may determine whether the first device is in a communication session with the second device. In some examples, the entity determines whether data indicative of the presence of the authorized user with the first device has been received from an independent device. The independent device may be unassociated with the authorized user. For instance, the independent device may be device installed in a building that monitors multiple individuals including the authorized user. In some examples, the independent device may capture images and/or audio of the authorized user in the vicinity (e.g., the same room or within a threshold distance) of the first device.

At 406, the entity determines a reauthentication interval and/or an authentication factor based on whether the first device is proximate to the second device and/or whether the authorized user of the first device has been independently confirmed. In various implementations, the entity may lengthen and/or set the reauthentication interval to a relatively long length (e.g., a length that is longer than a default reauthentication interval) if the entity determines that the first device is physically and/or virtually proximate to the second device. In some cases, the entity may lengthen and/or set the reauthentication interval to the relatively long length if the entity receives, from the independent device, data indicative of the presence of the authorized user with the first device. Alternatively, the entity may shorten and/or set the reauthentication interval to a relatively short length (e.g., a length that is shorter than the default reauthentication interval) if the entity determines that the first device is not physically and/or virtually proximate to the second device. In some examples, the entity may shorten and/or set the reauthentication interval to the relatively short length if the entity does not receive, from the independent device, data indicative of the presence of the authorized user with the first device.

According to various implementations, the entity may select an authentication factor based on whether the first device is proximate to the second device and/or whether the authorized user of the first device has been independently confirmed. For example, the entity may select an authentication factor with a relatively low stringency (e.g., a code) if the entity determines that the first device is physically and/or virtually proximate to the second device. In some cases, the entity may select an authentication factor with a relatively low stringency if the entity receives, from the independent device, data indicative of the presence of the authorized user with the first device. In contrast, the entity may select an authentication factor with a relatively high stringency (e.g., a biometric factor) if the entity determines that the first device is not physically and/or virtually proximate to the second device. In particular cases, the entity may select an authentication factor with a relatively high stringency if the entity does not receive, from the independent device, data indicative of the presence of the authorized user with the first device.

At 408, upon expiration of the reauthentication interval, the entity initiates reauthentication of the first device by requesting the authentication factor. The reauthentication interval, for example, may extend between the entity performing the first authentication to a time at which the entity disconnects the first device from the resource. In various implementations, the entity may request the authentication factor by transmitting a request for the authentication factor to the first device or another device associated with the authorized user. In particular implementations, the entity at least initiates MFA of the first device, and the authentication factor requested at 408 is of multiple authentication factors requested by the entity as a condition for reauthenticating the first device. If the entity is able to reauthenticate the first device, the entity may once again enable the first device to access the resource. However, if the entity is unable to reauthenticate the first device, the entity may refrain from reconnecting the first device to the resource.

Figure 5:
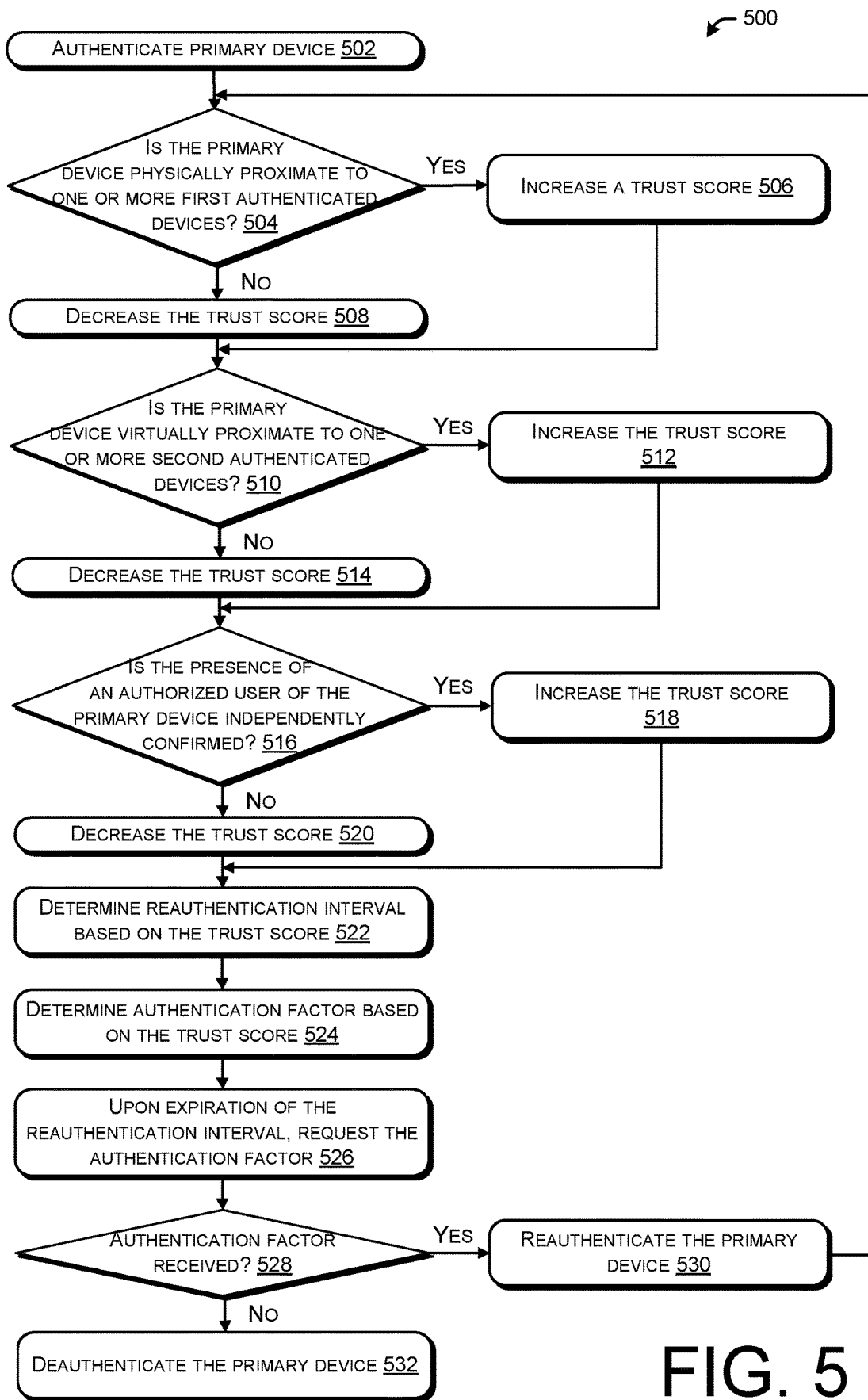
FIG. 5 illustrates an example process for performing enhanced reauthentication of a primary device based on the proximity of the primary device to other authenticated devices and whether the presence of an authorized user with the primary device is independently confirmed.

FIG. 5 illustrates an example process 500 for performing enhanced reauthentication of a primary device based on the proximity of the primary device to other authenticated devices and whether the presence of an authorized user with the primary device is independently confirmed. In various implementations, the process 500 may be performed by an entity, such as the security system 110 described above with reference to FIG. 1.

At 502, the entity authenticates the primary device. In some examples, the entity performs the authentication by performing MFA. For instance, the entity may transmit a request for a first authentication factor to the primary device, receive the first authentication factor from the primary device, transmit a request for a second authentication factor to the primary device or a secondary device associated with the authorized user, and receive the second authentication factor from the primary device or the secondary device. In various examples, the entity authenticates the primary device at a first time. In some examples, upon performing the authentication, the entity may enable the primary device to access a resource, such as a remote and/or secured resource. For instance, the primary device may be configured to transmit data to and/or receive data from the resource after the authenticated is performed.

At 504, the entity determines whether the primary device is physically proximate to one or more first authenticated devices. In some cases, the entity may determine whether the first device is located within a threshold distance of the first authenticated device(s), whether the first device is within a line-of-sight of the first authenticated device(s), whether the first device is connected to the same wireless AP as the first authenticated device(s), whether the first device is in the same finite space (e.g., building, room, hallway, or the like) as the first, or any combination thereof.

If the entity determines that the primary device is physically proximate to the first authenticated device(s) at 504, the entity increases a trust score of the primary device at 506. The trust score may be a metric that is indicative of a trustworthiness that the primary device is being operated by the authorized user. In some examples, the trust score is a number (e.g., a number greater than or equal to zero and less than or equal to 100). In some cases, the entity increases the trust score by an amount that is positively correlated with and/or proportional to the number of the first authenticated device(s). If, on the other hand, the entity is unable to determine that the primary device is physically proximate to the first authenticated device(s) at 504, the entity decreases the trust score at 508.

After completion of 506 or 508, the process 500 proceeds to 510. At 510, the entity determines whether the primary device is virtually proximate to one or more second authenticated devices. For instance, the entity may determine whether the first device is in a communication session with the second authenticated device(s). The communication session may include data being transmitted from the first device to the second authenticated device(s). In some cases, the communication session includes data being transmitted from the second authenticated device(s) to the first device. Examples of the communication session include a voice call, a video conference, or an instant messaging session.

If the entity determines that the primary device is virtually proximate to the second authenticated device(s) at 510, the entity increases the trust score of the primary device at 512. In some examples, the entity increases the trust score by an amount that is positively correlated with and/or proportional to the number of the second authenticated device(s). If, on the other hand, the entity is unable to determine that the primary device is virtually proximate to the second authenticated device(s) at 510, the entity decreases the trust score at 514.

After completion of 512 or 514, the process 500 proceeds to 516. At 516, the entity determines whether the presence of an authorized user of the primary device is independently confirmed. For example, the entity may determine whether it has received, from an independent device, data that is indicative of the presence of the authorized user is using the primary device.

If the entity determines that the presence of the authorized user has been independently confirmed at 516, the entity increases the trust score at 518. If, on the other hand, the entity is unable to determine that the presence of the authorized user has been independently confirmed at 516, the entity decreases the trust score at 520.

After completion of 518 or 520, the process 500 proceeds to 522. At 522, the entity determines a reauthentication interval based on the trust score. In various examples, the reauthentication interval is positively correlated with and/or proportional to the trust score. For example, if the trust score is greater than or equal to a threshold, the entity may give the reauthentication interval a length that is greater than or equal to a default reauthentication interval. In some examples, if the trust score is less than the threshold, the entity may give the reauthentication interval a length that is less than the default reauthentication interval.

At 524, the entity determines an authentication factor based on the trust score. In various examples, the stringency of the authentication factor may be inversely correlated with the trust score. For example, if the trust score is greater than or equal to a threshold, the entity may select a relatively nonstringent authentication factor, such as a code known to the authorized user. However, if the trust score is less than the threshold, the entity may select a relatively stringent authentication factor, such as a biometric factor of the authorized user.

At 526, upon expiration of the reauthentication interval, the entity requests the authentication factor. In some examples, the entity may also disconnect the primary device from the resource. For instance, the reauthentication interval may begin at the time that the primary device has been most recently authenticated, such as the time that 502 was performed. The entity may request the authentication factor by transmitting a request for the authentication factor to the primary device or a secondary device associated with the authorized user. In some examples, the entity may at least initiate MFA of the primary device, such that the authentication factor is one of multiple authentication factors requested by the entity.

At 528, the entity determines whether the authentication factor has been received. For example, the entity may receive, from the primary device or the secondary device, a response. The entity may determine whether the response includes the authentication factor associated with the authorized user. For example, if the authentication factor is a code, the entity may compare the response with the correct code.

If the entity determines that the authentication factor has been received at 528, the entity reauthenticates the primary device at 530. For example, the entity may enable the primary device to access the resource once again. After completion of 530, the process 500 returns to 504. If, on the other entity, the entity determines that the authentication factor has not been received at 528, the entity deauthenticates the primary device at 532. In some cases, the entity determines that the authentication factor has not been received within a predetermined time period of the request. The entity may prevent the primary device from accessing the resource.

Figure 6:
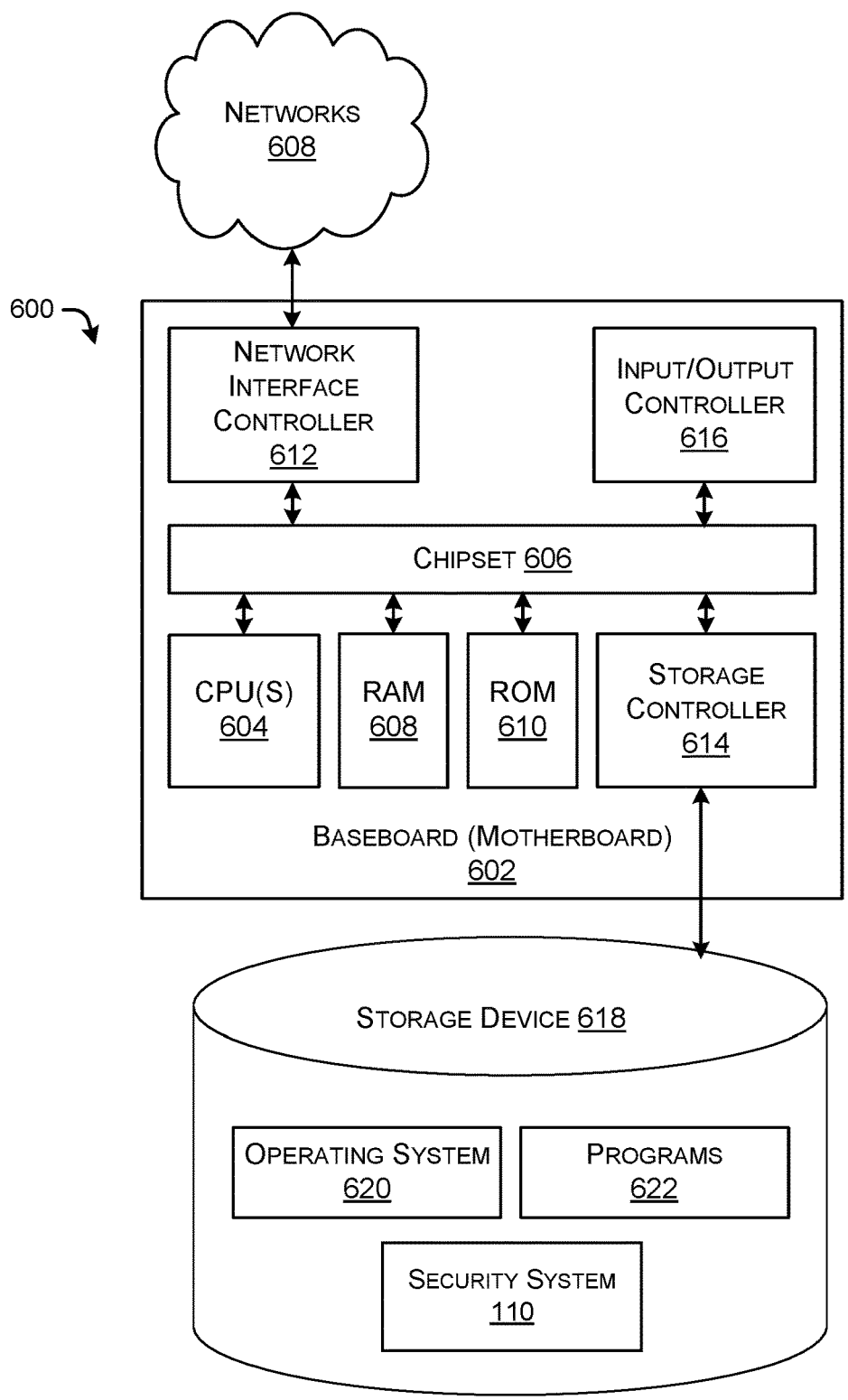
FIG. 6 shows an example computer architecture for a server computer capable of executing program components for implementing the functionality described herein.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 608. The chipset 606 can include functionality for providing network connectivity through a network interface controller (NIC) 612, such as a gigabit Ethernet adapter. The NIC 612 is capable of connecting the computer 600 to other computing devices over the network 608. It should be appreciated that multiple NICs 612 can be present in the computer 600, connecting the computer 600 to other types of networks and remote computer systems. In some instances, the NICs 612 may include at least on ingress port and/or at least one egress port.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX" operating system. According to another embodiment, the operating system includes the WINDOWS' SERVER operating system from MICROSOFT Corporation of Redmond, Washington. According to further embodiments, the operating system can comprise the UNIX™ operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 618 stores programs 622. The programs 622 may include instructions that, when executed by the CPU(s) 604, cause the computer 600 and/or the CPU(s) 604 to perform one or more operations. For example, the storage device 618 stores instructions that, when executed by the CPU(s) 604, causes the computer 600 to perform operations of the security system 110 described herein. The storage device 618 may also store other types of data, such as databases.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   performing a first authentication of a first device or a first user of the first device;
   based on performing the first authentication, connecting the first device to a protected resource;
   based on connecting the first device to the protected resource, determining that the first device is within a threshold distance of a second device associated with a second user, the second device or the second user being authenticated;
   selecting a reauthentication interval based on the first device being within the threshold distance of the second device; and
   based on determining that the reauthentication interval has expired, initiating a second authentication by transmitting, to the first device or a third device associated with the first user, a request for an authentication factor.

2. The method of claim 1, the authentication factor being a first authentication factor wherein performing the first authentication comprises:
- transmitting, to the first device, a request for a second authentication factor;
- receiving, from the first device, the second authentication factor;
- transmitting, to the first device or a third device, a request for a third authentication factor; and
- receiving, from the first device or the third device, the third authentication factor.

3. The method of claim 1, wherein determining that the first device is within the threshold distance of the second device comprises:
- determining that the first device and the second device are connected to a single access point (AP).

4. The method of claim 1, wherein the authentication factor comprises at least one of a code or an indication that the first device is located in a predetermined location.

5. The method of claim 1, further comprising:
- receiving, from at least one fourth device, an indication that the first user is operating the first device, and
- wherein selecting the reauthentication interval is further based on the indication that the first user is operating the first device.

6. The method of claim 5, wherein the indication that the first user is operating the first device comprises at least one of an image of the first user or audio of the first user.

7. The method of claim 1, wherein selecting the reauthentication interval based on the first device being within the threshold distance of the second device comprises shortening a previous reauthentication interval associated with the first device or the first user.

8. The method of claim 1, wherein initiating the second authentication comprises:
- disconnecting the first device from the protected resource.

9. A system, comprising:
- at least one processor; and
- memory storing instructions that, when executed by the system, cause the system to perform operations comprising:
  - determining that a first device associated with a first user is physically proximate to a second device associated with a second user, the second device or the second user being authenticated;
  - selecting a length of a reauthentication interval based on the first device being physically proximate to the second device; and
  - based on determining that the reauthentication interval has expired, initiating an authentication of the first device or the first user by transmitting, to the first device or a third device associated with the first user, a request for an authentication factor.

10. The system of claim 9, wherein determining that the first device associated with the first user is physically proximate to the second device associated with the second user comprises at least one of:
- determining that the first device and the second device are connected to a single access point (AP); or
- determining that the first device is within a threshold distance of the second device.

11. The system of claim 9, wherein determining that the first device is physically proximate the second device comprises determining that the first device is within line-of-sight of the second device.

12. The system of claim 9, wherein determining that the first device associated with the first user is physically proximate to the second device associated with the second user comprises determining that the first device has exchanged a message with the second device over a wireless connection.

13. The system of claim 9, wherein determining that the first device associated with the first user is physically proximate to the second device associated with the second user comprises at least one of:
- determining that the first device and the second device are located in a same room; or
- determining that the first device and the second device are located in a same building.

14. The system of claim 9, wherein selecting the length of the reauthentication interval based on the first device being physically proximate the second device comprises reducing a length of a previous reauthentication interval associated with the first device or the first user.

15. The system of claim 9, wherein the operations further comprise:
- in response to based on transmitting the request for the authentication factor, disconnecting the first device from a protected resource.

16. A system, comprising:
- at least one processor; and
- memory storing instructions that, when executed by the system, cause the system to perform operations comprising:
  - determining that a first device associated with a first user is physically proximate to at least one second device associated with at least one second user, the at least one second device or the at least one second user being authenticated;
  - selecting a length of a first reauthentication interval based on the first device being physically proximate to the at least one second device; and
  - based on determining that the first reauthentication interval has expired, initiating a first authentication of the first device or the first user by transmitting, to the first device or a third device associated with the first user, a first request for at least one first authentication factor;
  - determining that the first device is out of physical proximity of the at least one second device;
  - based on determining that the first device is out of physical proximity of the at least one second device, selecting a length of a second reauthentication interval, the length of the second reauthentication interval being shorter than the length of the first reauthentication interval; and
  - based on determining that the second reauthentication interval has expired, initiating a second authentication of the first device or the first user by transmitting, to the first device or the third device, a second request for at least one second authentication factor.

17. The system of claim 16, wherein selecting the length of the first reauthentication interval based on the first device being physically proximate to the at least one second device comprises:
- calculating a trust score associated with the first device; and
- determining the length of the first reauthentication interval based on the trust score, and
- wherein selecting the length of the second reauthentication interval based on the first device being physically proximate the at least one second device comprises:
  - adjusting the trust score associated with the first device; and based on adjusting the trust score associated with the first device, determining the length of the second reauthentication interval based on the trust score.

18. The system of claim 17, wherein the operations further comprise:

in response to calculating the trust score associated with the first device, selecting the at least one first authentication factor, and in response to adjusting the trust score associated with the first device, selecting the at least one second authentication factor, wherein the at least one first authentication factor has a lower stringency level than the at least one second authentication factor.

19. The system of claim 16, wherein determining that the first device associated with the first user is physically proximate to the at least one second device associated with the at least one second user comprises at least one of:

determining that the first device and the at least one second device are connected to a single access point (AP);

determining that the first device is within a threshold distance of the at least one second device;

determining that the first device is within line-of-sight of the at least one second device;

determining that the first device and the at least one second device have exchanged at least one message over at least one wireless connection;

determining that the first device and the at least one second device are located in a same room; or determining that the first device and the at least one second device are located in a same building.

20. The system of claim 16, wherein the operations further comprise:

based on determining that the second reauthentication interval has expired, disconnecting the first device from a protected resource.

* * * * *